US011601784B2

(12) United States Patent
Jiang et al.

(10) Patent No.: US 11,601,784 B2
(45) Date of Patent: *Mar. 7, 2023

(54) PEDESTRIAN POSITIONING VIA VEHICLE COLLABORATION

(71) Applicant: QUALCOMM Incorporated, San Diego, CA (US)

(72) Inventors: Libin Jiang, Seattle, WA (US); Sudhir Kumar Baghel, Hillsborough, NJ (US); Junyi Li, Franklin Park, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/306,832

(22) Filed: May 3, 2021

(65) Prior Publication Data

US 2021/0258736 A1    Aug. 19, 2021

Related U.S. Application Data

(63) Continuation of application No. 16/814,965, filed on Mar. 10, 2020, now Pat. No. 10,999,706, which is a
(Continued)

(51) Int. Cl.
*G01S 5/00* (2006.01)
*G01S 5/02* (2010.01)
(Continued)

(52) U.S. Cl.
CPC ............ *H04W 4/029* (2018.02); *G01S 5/0027* (2013.01); *G01S 5/0072* (2013.01); *G01S 5/0284* (2013.01); *H04W 4/90* (2018.02)

(58) Field of Classification Search
CPC ....... H04W 4/029; H04W 4/90; G01S 5/0027; G01S 5/0072; G01S 5/0284
See application file for complete search history.

(56) References Cited

U.S. PATENT DOCUMENTS 9,210,023 B1    12/2015  Nagaraja et al.
10,623,908 B2    4/2020  Jiang et al.
(Continued)

FOREIGN PATENT DOCUMENTS

EP    3246723 A1    11/2017
WO    2017023474 A1    2/2017

OTHER PUBLICATIONS

International Preliminary Report on Patentability—PCT/US2019/020078, The International Bureau of WIPO—Geneva, Switzerland, dated Sep. 10, 2020.
(Continued)

*Primary Examiner* — Joseph E Dean, Jr.
(74) *Attorney, Agent, or Firm* — Campbell Chiang; MG-IP Law, P.C.

(57) ABSTRACT

Disclosed are techniques for using ranging signals to determine a position of a pedestrian user equipment (P-UE). In an aspect, a UE receives a plurality of ranging signals transmitted by one or more UEs, measures one or more properties of each of the plurality of ranging signals, and calculates an estimate of the position of the P-UE based on the one or more properties of each of the plurality of ranging signals. In an aspect, the P-UE transmits a plurality of ranging signals, receives a first message and a second message from first and second vehicle UEs (V-UEs), the first and second messages including first and second estimated positions of the P-UE and associated first and second confidences, and calculates an estimate of the position of the P-UE based on the first estimated position, the first confidence, the second estimated position, the second confidence, or a combination thereof.

28 Claims, 11 Drawing Sheets

Related U.S. Application Data continuation of application No. 16/287,762, filed on Feb. 27, 2019, now Pat. No. 10,623,908.

(60) Provisional application No. 62/636,762, filed on Feb. 28, 2018.

(51) Int. Cl.
*H04W 4/029* (2018.01)
*H04W 4/90* (2018.01)

(56) References Cited

U.S. PATENT DOCUMENTS

| | | |
|---|---|---|
| 2009/0201208 A1* | 8/2009 | McPherson ............ G01S 13/878 342/458 |
| 2010/0277387 A1 | 11/2010 | Schantz et al. |
| 2016/0183053 A1 | 6/2016 | Bao et al. |
| 2019/0221110 A1* | 7/2019 | Vanderveen ..... G08G 1/096741 |
| 2019/0268726 A1 | 8/2019 | Jiang et al. |
| 2020/0213813 A1 | 7/2020 | Jiang et al. |

OTHER PUBLICATIONS

International Search Report and Written Opinion—PCT/US2019/020078—ISA/EPO—dated Jul. 30, 2019.
Partial International Search Report—PCT/US2019/020078—ISA/EPO—dated Jun. 4, 2019.

\* cited by examiner

PEDESTRIAN POSITIONING VIA VEHICLE COLLABORATION

CROSS-REFERENCE TO RELATED APPLICATIONS

The present application for patent is a continuation of U.S. application Ser. No. 16/814,965, entitled "PEDESTRIAN POSITIONING VIA VEHICLE COLLABORATION," filed Mar. 10, 2020, which is a continuation of U.S. application Ser. No. 16/287,762, entitled "PEDESTRIAN POSITIONING VIA VEHICLE COLLABORATION," filed Feb. 27, 2019, which claims the benefit of U.S. Provisional Application No. 62/636,762, entitled "PEDESTRIAN POSITIONING VIA VEHICLE COLLABORATION," filed Feb. 28, 2018, each assigned to the assignee hereof, and expressly incorporated herein by reference in its entirety.

INTRODUCTION

Aspects of this disclosure relate generally to pedestrian positioning via vehicle collaboration.

Around the world, Vehicle-to-Everything (V2X) communication technologies are being implemented to support Intelligent Transportation Systems (ITS) applications, such as wireless communications between vehicles (Vehicle-to-Vehicle (V2V)), between vehicles and the roadside infrastructure (Vehicle-to-Infrastructure (V2I)), and between vehicles and pedestrians (Vehicle-to-Pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

The V2P approach encompasses a broad set of road users, including people walking, children being pushed in strollers, people using wheelchairs or other mobility devices, passengers embarking and disembarking buses and trains, people riding bicycles, and the like. Pedestrian detection systems can be implemented in vehicles, in the infrastructure, or with the pedestrians themselves to provide warnings to drivers, pedestrians, or both. For example, when a pedestrian who is blind or has low-vision is at a crosswalk, the pedestrian's smartphone can make a "call" to the traffic signal associated with the crosswalk. The traffic signal can then broadcast a message to nearby vehicles attempting to make a turn to alert them to the presence of the pedestrian at the crosswalk. As another example, transit bus operators can be warned when pedestrians, within the crosswalk of a signalized intersection, are in the intended path of the bus.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for using ranging signals to determine a position of a pedestrian user equipment (P-UE) includes receiving a plurality of ranging signals transmitted by one or more UEs, measuring one or more properties of each of the plurality of ranging signals, and calculating an estimate of the position of the P-UE based on the one or more properties of each of the plurality of ranging signals.

In an aspect, a method for determining a position of a P-UE includes transmitting, by the P-UE, a plurality of ranging signals in a plurality of ranging resource sets, receiving, at the P-UE, a first message from a first vehicle user equipment (V-UE), the first message including a first estimated position of the P-UE and a first indicator of confidence of the first estimated position, receiving, at the P-UE, a second message from a second V-UE, the second message including a second estimated position of the P-UE and a second indicator of confidence of the second estimated position, and calculating, by the P-UE, an estimate of the position of the P-UE based on the first estimated position, the first indicator, the second estimated position, the second indicator, or a combination thereof.

In an aspect, an apparatus for using ranging signals to determine a position of a P-UE includes a transceiver of a first UE configured to: receive a plurality of ranging signals transmitted by one or more UEs, and measure one or more properties of each of the plurality of ranging signals, and at least one processor of the first UE configured to calculate an estimate of the position of the P-UE based on the one or more properties of each of the plurality of ranging signals.

In an aspect, an apparatus for determining a position of a P-UE includes a transceiver of the P-UE configured to: transmit a plurality of ranging signals in a plurality of ranging resource sets, receive a first message from a first V-UE, the first message including a first estimated position of the P-UE and a first indicator of confidence of the first estimated position, and receive a second message from a second V-UE, the second message including a second estimated position of the P-UE and a second indicator of confidence of the second estimated position, and at least one processor of the P-UE configured to calculate an estimate of the position of the P-UE based on the first estimated position, the first indicator, the second estimated position, the second indicator, or a combination thereof.

In an aspect, a non-transitory computer-readable medium storing computer-executable instructions for using ranging signals to determine a position of a P-UE includes at least one instruction instructing a first UE to receive a plurality of ranging signals transmitted by one or more UEs, at least one instruction instructing the first UE to measure one or more properties of each of the plurality of ranging signals, and at least one instruction instructing the first UE to calculate an estimate of the position of the P-UE based on the one or more properties of each of the plurality of ranging signals.

In an aspect, a non-transitory computer-readable medium storing computer-executable instructions for determining a position of a P-UE includes at least one instruction instructing the P-UE to transmit a plurality of ranging signals in a plurality of ranging resource sets, at least one instruction instructing the P-UE to receive a first message from a first V-UE, the first message including a first estimated position of the P-UE and a first indicator of confidence of the first estimated position, at least one instruction instructing the P-UE to receive a second message from a second V-UE, the second message including a second estimated position of the P-UE and a second indicator of confidence of the second estimated position, and at least one instruction instructing the P-UE to calculate an estimate of the position of the P-UE based on the first estimated position, the first indicator, the second estimated position, the second indicator, or a combination thereof.

In an aspect, an apparatus for using ranging signals to determine a position of a P-UE includes a means for communication of a first UE configured to: receive a plurality of ranging signals transmitted by one or more UEs, and measure one or more properties of each of the plurality of ranging signals, and means for processing of the first UE configured to calculate an estimate of the position of the P-UE based on the one or more properties of each of the plurality of ranging signals.

In an aspect, an apparatus for determining a position of a P-UE includes a means for communicating of the P-UE configured to: transmit a plurality of ranging signals in a plurality of ranging resource sets, receive a first message from a first V-UE, the first message including a first estimated position of the P-UE and a first indicator of confidence of the first estimated position, and receive a second message from a second V-UE, the second message including a second estimated position of the P-UE and a second indicator of confidence of the second estimated position, and a means for processing of the P-UE configured to calculate an estimate of the position of the P-UE based on the first estimated position, the first indicator, the second estimated position, the second indicator, or a combination thereof.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

As used herein, the terms User Equipment (UE), Vehicle User Equipment (V-UE) and Pedestrian User Equipment (P-UE) are not intended to be specific or otherwise limited to any particular type of device or Radio Access Technology (RAT), unless otherwise noted. In general, a P-UE may be any portable (e.g., handheld) wireless communication device (e.g., a mobile cellular phone, such as a "smartphone," a tablet computer, a Personal Digital Assistance (PDA), a wearable device, such as a "smart watch," a personal navigation device, etc.) used by a user to communicate over a wireless communications network, and may be alternatively referred to in different RAT environments as an Access Terminal (AT), a Mobile Station (MS), a Subscriber Station (STA), a client device, a user device, a mobile device, etc. A V-UE may be any in-vehicle wireless communication device, such as a navigation system, a warning system, a Heads-Up Display (HUD), etc. Alternatively, a V-UE may be a portable wireless communication device, like a P-UE, except that it belongs to the driver of the vehicle or a passenger in the vehicle. The term "V-UE" may refer to the in-vehicle wireless communication device or the vehicle itself, depending on the context.

Figure 1:
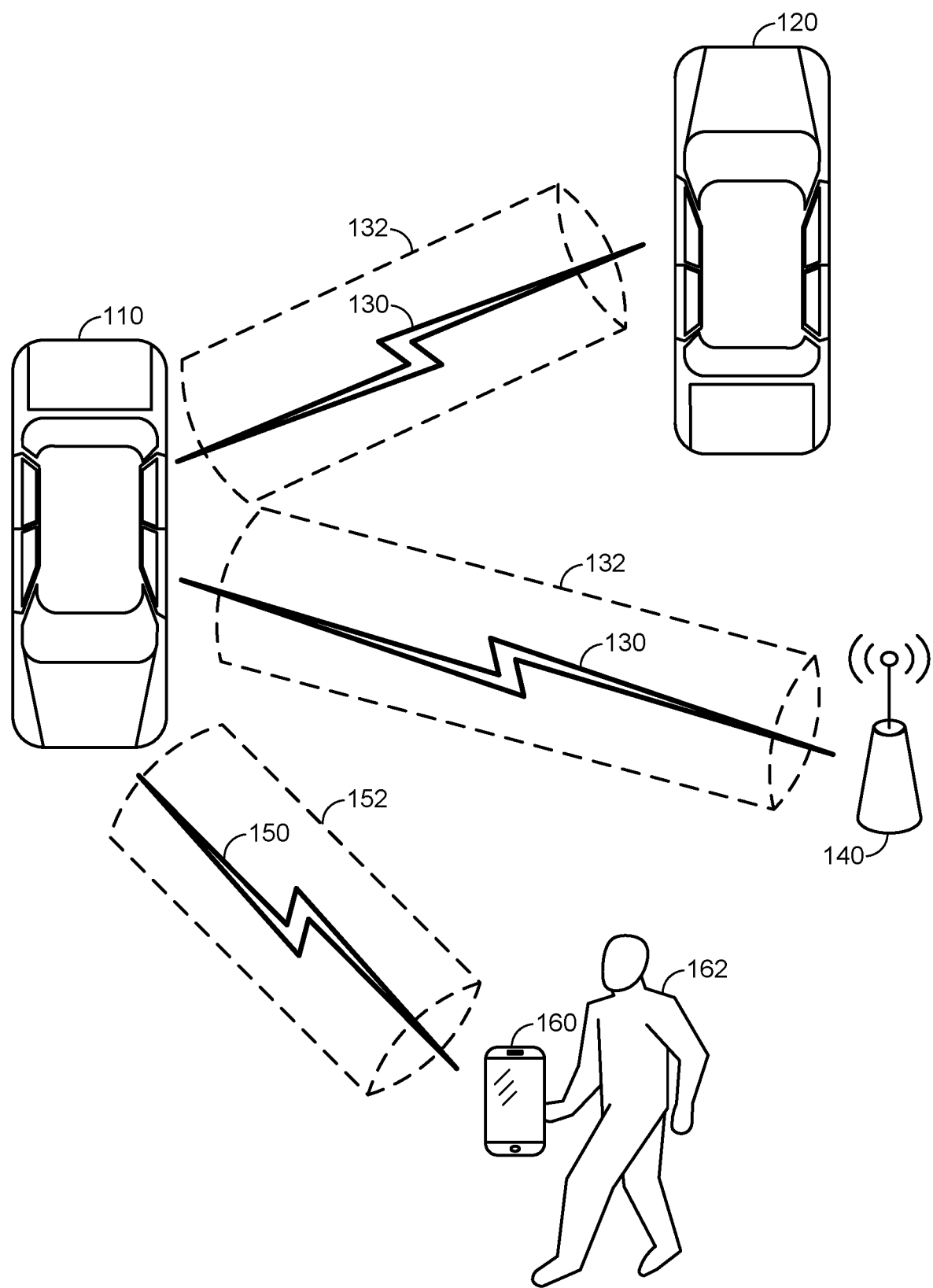
FIG. 1 illustrates an example wireless communication system including a vehicle in communication with one or more other vehicles and one or more roadside access points according to at least one aspect of the disclosure.

FIG. 1 illustrates an example wireless communication system including a V-UE 110 in communication with one or more other V-UEs 120, one or more roadside access points 140, and one or more P-UEs 160. In the example of FIG. 1, the V-UE 110 may transmit and receive messages with the one or more V-UEs 120 and the one or more roadside access points 140 via a first wireless link 130. The wireless link 130 may operate over a communication medium of interest, shown by way of example in FIG. 1 as the medium 132, which may be shared with other communications between other vehicles and/or infrastructure access points, as well as other RATs. The V-UE 110 may also transmit and receive messages with the one or more P-UEs 160 belonging to one or more pedestrians 162 via a second wireless link 150. The wireless link 150 may operate over a communication medium of interest, shown by way of example in FIG. 1 as the medium 152, which may be shared with other communications between other vehicles and/or infrastructure access points, as well as other RATs. A "medium," such as mediums 132 and 152, may be composed of one or more frequency, time, and/or space communication resources (e.g., encompassing one or more channels across one or more carriers) associated with communication between one or more transmitter/receiver pairs.

In an aspect, the wireless links 130 and 150 may be Cellular Vehicle-to-Everything (C-V2X) links. A first generation of C-V2X has been standardized in Long-Term Evolution (LTE), and the next generation is expected to be defined in Fifth Generation (5G) (also referred to as "New Radio" (NR) or "5G NR"). C-V2X is a cellular technology that also enables device-to-device communications. In the U.S. and Europe, C-V2X is expected to operate in the licensed ITS band in sub-6 GHz. Other bands may be allocated in other countries. Thus, referring to FIG. 1, as a particular example, the mediums 132 and 152 may correspond to at least a portion of the licensed ITS frequency band of sub-6 GHz. However, the present disclosure is not limited to this frequency band or cellular technology.

In an aspect, the wireless links 130 and 150 may be Dedicated Short-Range Communications (DSRC) links. DSRC is a one-way or two-way short-range to medium-range wireless communication protocol that uses the Wireless Access for Vehicular Environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, referring to FIG. 1, as a particular example, the mediums 132 and 152 may correspond to at least a portion of the licensed ITS frequency band of 5.9 GHz.

Alternatively, the medium 152 may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi." Example systems of this type include different variants of Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, and so on.

Communications between the V-UEs 110 and 120 are referred to as V2V communications, communications between the V-UE 110 and the one or more roadside access points 140 are referred to as V2I communications, and communications between the V-UE 110 and the one or more P-UEs 160 are referred to as V2P communications. The V2V communications between V-UEs 110 and 120 may include, for example, information about the position, speed, acceleration, heading, and other vehicle data of the V-UEs 110 and 120. The V2I information received at the V-UE 110 from the one or more roadside access points 140 may include, for example, road rules, parking automation information, etc. The V2P communications between the V-UE 110 and the P-UEs 160 may include information about, for example, the position, speed, acceleration, and heading of the V-UE 110 and the position, speed (e.g., where the P-UE 160 is a bicycle), and heading of the P-UE 160.

Figure 2:
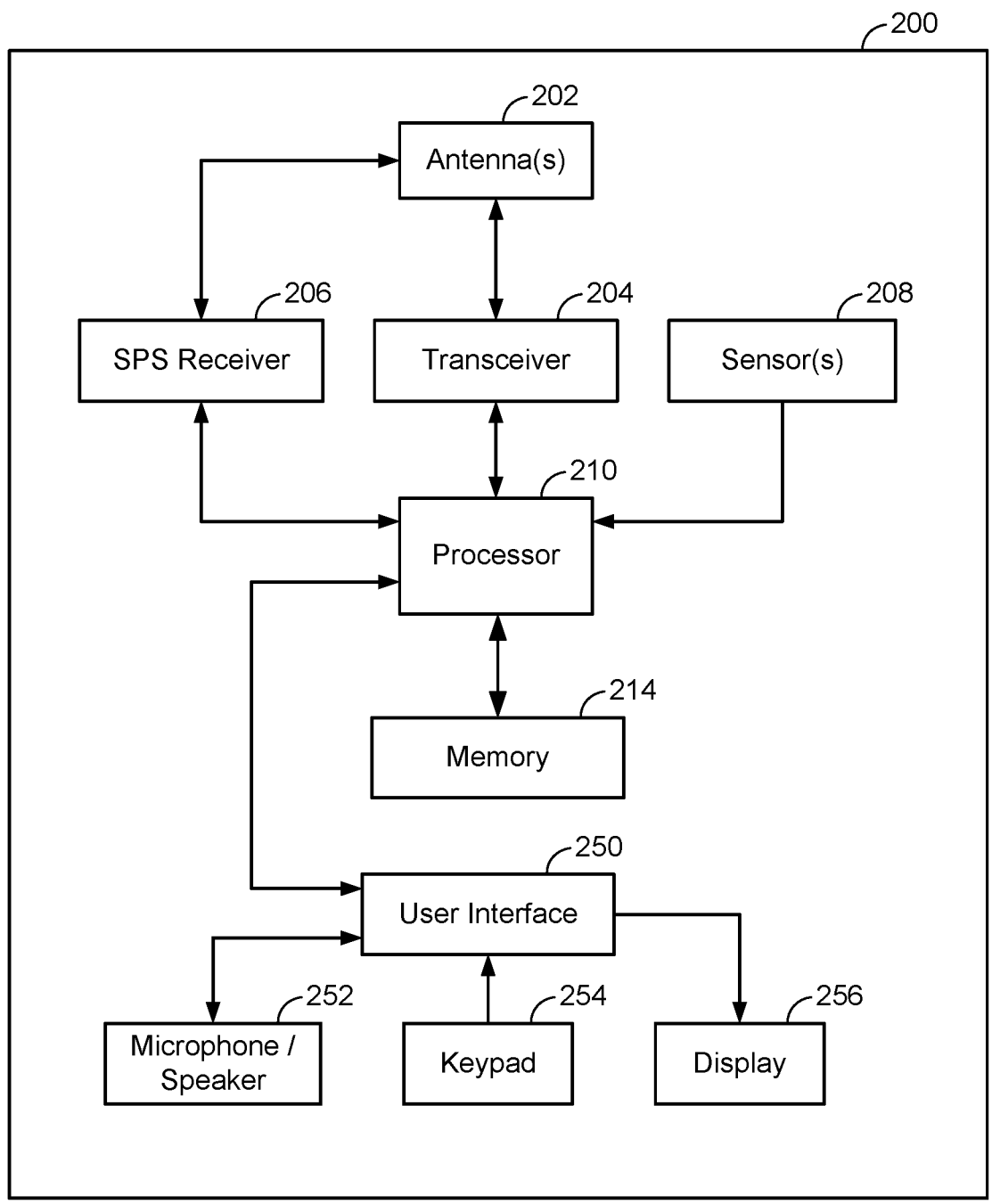
FIG. 2 is a block diagram illustrating various components of an exemplary vehicle according to at least one aspect of the disclosure.

FIG. 2 is a block diagram illustrating various components of an exemplary V-UE 200, which may correspond to V-UE 110 and/or V-UE 120 in FIG. 1. For the sake of simplicity, the various features and functions illustrated in the block diagram of FIG. 2 are connected together using a common bus that is meant to represent that these various features and functions are operatively coupled together. Those skilled in the art will recognize that other connections, mechanisms, features, functions, or the like, may be provided and adapted as necessary to operatively couple and configure an actual V-UE. Further, it is also recognized that one or more of the features or functions illustrated in the example of FIG. 2 may be further subdivided, or two or more of the features or functions illustrated in FIG. 2 may be combined.

The V-UE 200 may include at least one transceiver 204 connected to one or more antennas 202 for communicating with other network nodes, e.g., other vehicles (e.g., the one or more other V-UEs 120), infrastructure access points (e.g., the one or more roadside access points 140), P-UEs (e.g., the one or more P-UEs 160), etc., via at least one designated radio access technology (RAT), e.g., C-V2X or IEEE 802.11p, over the medium 132/152. The transceiver 204 may be variously configured for transmitting and encoding signals (e.g., messages, indications, information, and so on), and, conversely, for receiving and decoding signals (e.g., messages, indications, information, pilots, and so on) in accordance with the designated RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The V-UE 200 may also include a satellite positioning service (SPS) receiver 206. The SPS receiver 206 may be connected to the one or more antennas 202 for receiving satellite signals. The SPS receiver 206 may comprise any suitable hardware and/or software for receiving and processing SPS signals. The SPS receiver 206 requests information and operations as appropriate from the other systems, and performs the calculations necessary to determine the V-UE's 200 position using measurements obtained by any suitable SPS algorithm.

One or more sensors 208 may be coupled to a processor 210 to provide information related to the state and/or environment of the V-UE 200, such as speed, heading (e.g., compass heading), headlight status, gas mileage, etc. By way of example, the one or more sensors 208 may include an accelerometer (e.g., a microelectromechanical systems (MEMS) device), a gyroscope, a geomagnetic sensor (e.g., a compass), an altimeter (e.g., a barometric pressure altimeter), etc.

The processor 210 may include one or more microprocessors, microcontrollers, ASICs, and/or digital signal processors that provide processing functions, as well as other calculation and control functionality. The processor 210 may include any form of logic suitable for performing, or causing the components of the V-UE 200 to perform, at least the techniques provided herein.

The processor 210 may also be coupled to a memory 214 for storing data and software instructions for executing programmed functionality within the V-UE 200. The memory 214 may be on-board the processor 210 (e.g., within the same integrated circuit (IC) package), and/or the memory 214 may be external to the processor 210 and functionally coupled over a data bus.

The V-UE 200 may include a user interface 250 that provides any suitable interface systems, such as a microphone/speaker 252, keypad 254, and display 256 that allow user interaction with the V-UE 200. The microphone/speaker 252 provides for voice communication services with the V-UE 200. The keypad 254 comprises any suitable buttons for user input to the V-UE 200. The display 256 comprises any suitable display, such as, for example, a backlit LCD display, and may further include a touch screen display for additional user input modes.

Figure 3:
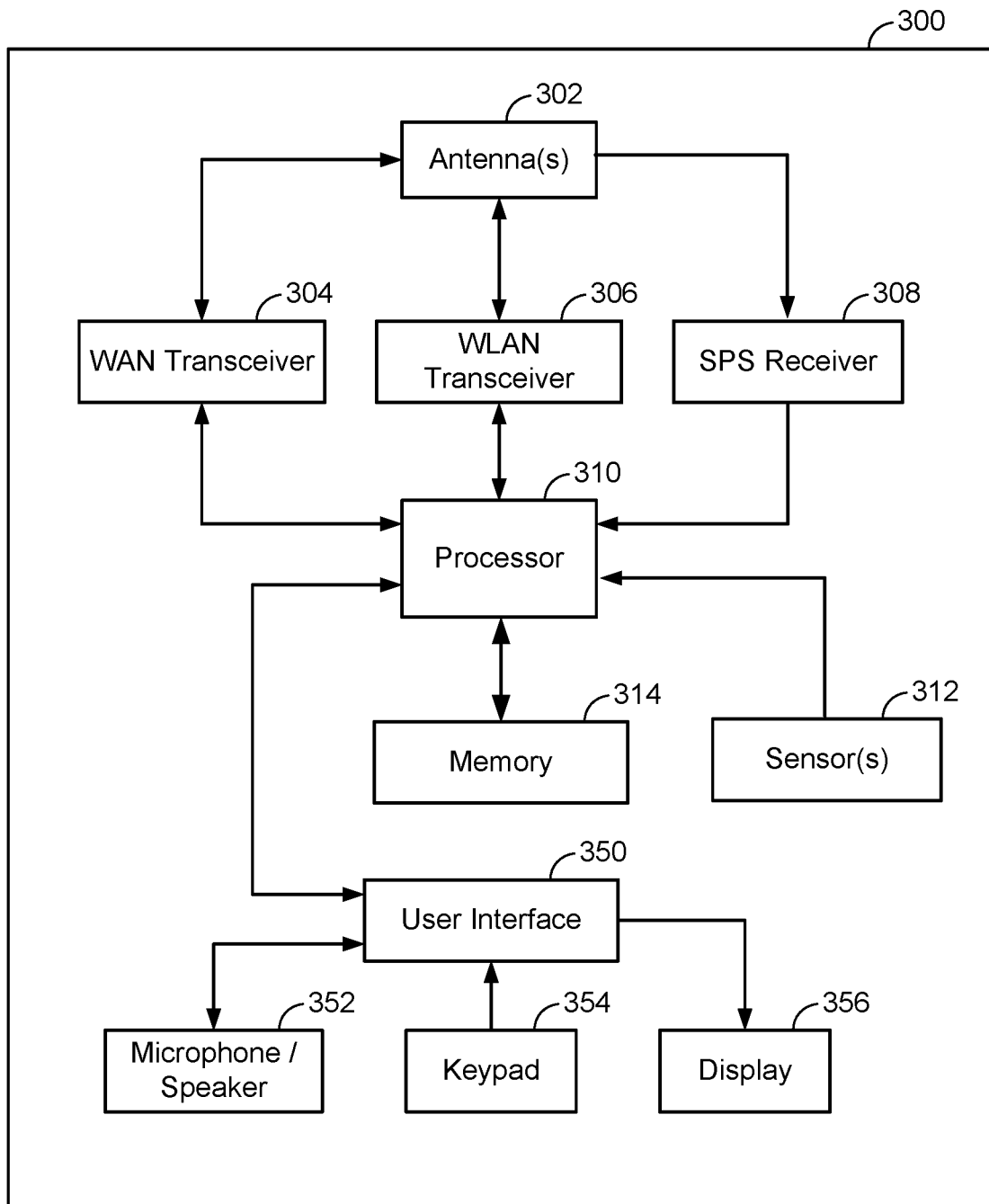
FIG. 3 is a block diagram illustrating various components of an exemplary user device according to at least one aspect of the disclosure.

FIG. 3 is a block diagram illustrating various components of an exemplary P-UE 300, which may correspond to P-UE 160 in FIG. 1. For the sake of simplicity, the various features and functions illustrated in the block diagram of FIG. 3 are connected together using a common bus which is meant to represent that these various features and functions are operatively coupled together. Those skilled in the art will recognize that other connections, mechanisms, features, functions, or the like, may be provided and adapted as necessary to operatively couple and configure an actual P-UE. Further, it is also recognized that one or more of the features or functions illustrated in the example of FIG. 3 may be further subdivided, or two or more of the features or functions illustrated in FIG. 3 may be combined.

The P-UE 300 may include one or more wide area network (WAN) transceiver(s) 304 that may be connected to one or more antennas 302. The one or more WAN transceivers 304 may comprise suitable devices, hardware, and/or software for communicating with and/or detecting signals to/from WAN access points (e.g., cellular base stations), and/or directly with other wireless devices within a network. In one aspect, the WAN transceiver(s) 304 may comprise an LTE communication system (including C-V2X) suitable for communicating with an LTE network of wireless base stations and/or other UEs (e.g., in the case of C-V2X); however in other aspects, the wireless communication system may comprise another type of cellular telephony network, such as, for example, 5G. Additionally, any other type of wide area wireless networking technologies may be used, such as WiMAX (IEEE 802.16).

The P-UE 300 may also include one or more wireless local area network (WLAN) transceivers 306 that may also be connected to the one or more antennas 302. The one or more WLAN transceivers 306 may comprise suitable devices, hardware, and/or software for communicating with and/or detecting signals to/from WLAN access points (e.g., access points of Wi-Fi networks (IEEE 802.11x), cellular piconets and/or femtocells, Bluetooth networks, etc.), and/or directly with other wireless devices within a network. In one aspect, the WLAN transceiver(s) 306 may comprise a Wi-Fi (IEEE 802.11x) communication system suitable for communicating with one or more wireless access points; however, in other aspects, the WLAN transceiver(s) 306 may comprise another type of local area network or personal area network, such as IEEE 802.11p, Bluetooth, etc. Additionally, any other type of wireless networking technologies may be used, for example, Ultra-Wide Band, ZigBee, wireless Universal Serial Bus (USB), etc.

The P-UE 300 may also include an SPS receiver 308. The SPS receiver 308 may also be connected to the one or more antennas 302 for receiving satellite signals. The SPS receiver 308 may comprise any suitable hardware and/or software for receiving and processing SPS signals. The SPS receiver 308 requests information and operations as appropriate from the other systems, and performs the calculations necessary to determine the P-UE 300 position using measurements obtained by any suitable SPS algorithm.

One or more sensors 312 may be coupled to a processor 310 to provide information related to the state and/or environment of the P-UE 300, such as motion, speed, heading, etc. By way of example, the one or more sensors 312 may include an accelerometer (e.g., a microelectromechanical systems (MEMS) device), a gyroscope, a geomagnetic sensor (e.g., a compass), an altimeter (e.g., a barometric pressure altimeter), etc.

The processor 310 may include one or more microprocessors, microcontrollers, ASICs, and/or digital signal processors that provide processing functions, as well as other calculation and control functionality. The processor 310 may include any form of logic suitable for performing, or causing the components of the P-UE 300 to perform, at least the techniques provided herein.

The processor 310 may also be coupled to a memory 314 for storing data and software instructions for executing programmed functionality within the P-UE 300. The memory 314 may be on-board the processor 310 (e.g., within the same IC package), and/or the memory 314 may be external to the processor 310 and functionally coupled over a data bus.

The P-UE 300 may include a user interface 350 that provides any suitable interface systems, such as a microphone/speaker 352, keypad 354, and display 356 that allow user interaction with the P-UE 300. The microphone/speaker 352 provides for voice communication services with the P-UE 300. The keypad 354 comprises any suitable buttons for user input to the P-UE 300. The display 356 comprises any suitable display, such as, for example, a backlit LCD display, and may further include a touch screen display for additional user input modes.

In the Safety Channel described above, each vehicle, such as V-UE 200, periodically broadcasts the Basic Safety Message (BSM), known also in similar systems (e.g., Europe) as the Cooperative Awareness Message (CAM), to provide information about the vehicle. Pedestrian devices, such as P-UE 300, may also broadcast BSMs. Other systems may also exist for providing vehicular safety messages that may or may not implement the techniques described herein (e.g., Chinese and Japanese vehicle messaging systems).

BSMs are described in the "Surface Vehicle Standard," SAE J2735, published by Society of Automotive Engineers (SAE) International in 2015, which is incorporated herein in its entirety. Each BSM includes the BSM Part I message and the BSM Part II DF_VehicleSafetyExtension data frames, DF_PathHistory, and DF_PathPrediction. Each BSM includes the BSM Part II DF_VehicleSafetyExtension data element and DF_EventFlags only as long as an event is active. This data element is not included in a BSM unless at least one event flag is active, i.e., set to logical "1." Each BSM may optionally include the BSM Part II DF_VehicleSafetyExtension data frame and DF_RTCMPackage. Table 1 illustrates the data elements (DE) and/or data fields (DF) that can be transmitted in a BSM.

TABLE 1

BSM Data Elements/Fields

| Req. Number | Data Element/Field |
| --- | --- |
| BSM Part I | DE_DSRCMsgID |
|  | DE_MsgCount |
|  | DE_TemporaryID |
|  | DE_Dsecond |
|  | DE_Latitude |
|  | DE_Longitude |
|  | DE_Elevation |
|  | DF_PositionalAccuracy |
|  | DF_TransmissionAndSpeed |
|  | DE_Speed |
|  | DE_TransmissionState |
|  | DE_Heading |
|  | DE_SteeringWheelAngle |
|  | DF_AccelerationSet4Way |
|  | DE_Acceleration (Longitudinal) |
|  | DE_Acceleration (Lateral) |
|  | DE_VerticalAcceleration |
|  | DE_YawRate |
|  | DF_BrakeSystemStatus |
|  | DF_VehicleSize |
|  | DE_VehicleWidth |
|  | DE_VehicleLength |
| BSM Part II | DE_EventFlags |
|  | DF_PathHistory |
|  | DF_PathPrediction |
|  | DF_RTCMPackage |

Aside from "routine" information about vehicle position and other data carried in the BSM Part I message, the BSM can transmit information about safety related "events" in the BSM Part II DF_VehicleSafetyExtension data frames, for example, hard braking actions, that can be used to inform the driver of the receiving vehicle about the event and/or to allow the receiving vehicle to perform automated operations in response to the event, such as automatic braking, steering, and/or throttling for collision avoidance. When the DE_EventFlag is not active, the nominal rate at which BSMs are broadcast is 10 Hz (i.e., 10 times per second). After an initial BSM reporting a safety event, i.e., having the DE_EventFlag set to "1," subsequent BSMs, which may still have the DE_EventFlag set to "1" (as a safety event may last for several seconds), continue to be transmitted at a nominal rate of 10 Hz.

As described above, in V2P communications, both P-UEs and V-UEs can periodically broadcast BSMs containing their positions and/or speeds to other vehicles and/or pedestrians to avoid collisions. The reported position of a pedestrian, however, may not be accurate. For example, where the position of a pedestrian is an SPS position (e.g., a GPS position), a pedestrian who just walked out of a building may not have an accurate SPS position because SPS signals are generally weak or nonexistent in indoor environments and the P-UE will not yet have acquired an accurate position outdoors. Even for pedestrians who have been outdoors for some time (e.g., walking along the street), SPS signals may still be blocked and/or deflected by high buildings. As would be appreciated, broadcasting inaccurate SPS positions in BSMs is not helpful for safety applications, and may even be dangerous.

The present disclosure introduces a pedestrian positioning protocol that uses ranging signals to determine an accurate position of a pedestrian. The protocol has three modes. In the first two modes, the P-UE transmits ranging signals to nearby V-UEs, and in the third mode, V-UEs transmit ranging signals to nearby P-UEs.

Figure 4:
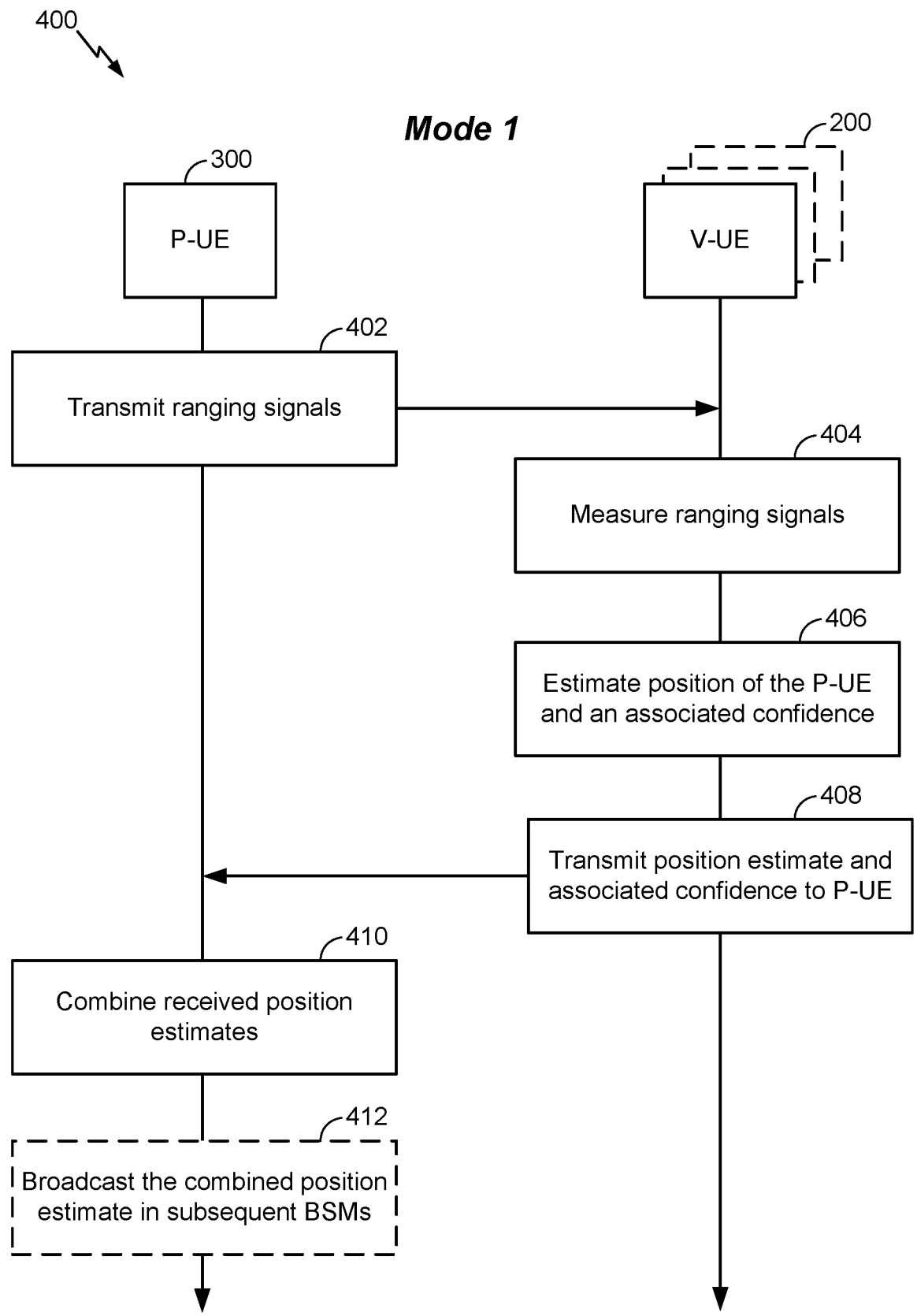
FIG. 4 illustrates a method of the first mode for using ranging signals to determine an accurate position of a pedestrian.

FIG. 4 illustrates an exemplary method 400 of the first mode for using ranging signals to determine an accurate position of a pedestrian (i.e., a P-UE). At operation 402, a P-UE 300 transmits multiple ranging signals in multiple "ranging resource pools." A ranging resource pool may consist of a set of time and/or frequency resources (e.g., 10 subframes in LTE/5G terminology) and may occur periodically (e.g., once every second). The P-UE 300 may transmit a ranging signal in each of several consecutive ranging resource pools.

In an aspect, the P-UE 300 may transmit an identifier (ID) along with the ranging signals. For example, the ID of the P-UE 300 may be encoded in the ranging signals. In an aspect, the ranging signals may be Zadoff-Chu sequences, and the sequence ID of a ranging signal may correspond to the ID of the P-UE 300. A Zadoff-Chu sequence is a mathematical sequence that, when applied to radio signals, creates a signal of constant amplitude, whereby cyclically shifted versions of the sequence imposed on a signal result in zero correlation with one another at the receiver. Zadoff-Chu sequences are currently used in LTE for the Primary Synchronization Signal (PSS), Random Access Preamble (PRACH), Physical Uplink Control Channel (PUCCH), Physical Uplink Shared Channel (PUSCH), and Sounding Reference Signal (SRS). By assigning orthogonal Zadoff-Chu sequences to each P-UE 300, the cross-correlation of simultaneous transmissions from P-UEs 300 is reduced, thereby reducing interference and uniquely identifying P-UE 300 transmissions.

In an aspect, the P-UE 300 may transmit the ranging signals described herein only when it intends to refine its position. For example, the P-UE 300 may transmit ranging signals when the accuracy of its SPS position is below a threshold, which, as noted above, may occur when, for example, the P-UE 300 has just come outside or when it is surrounded by tall buildings.

Figure 5A:
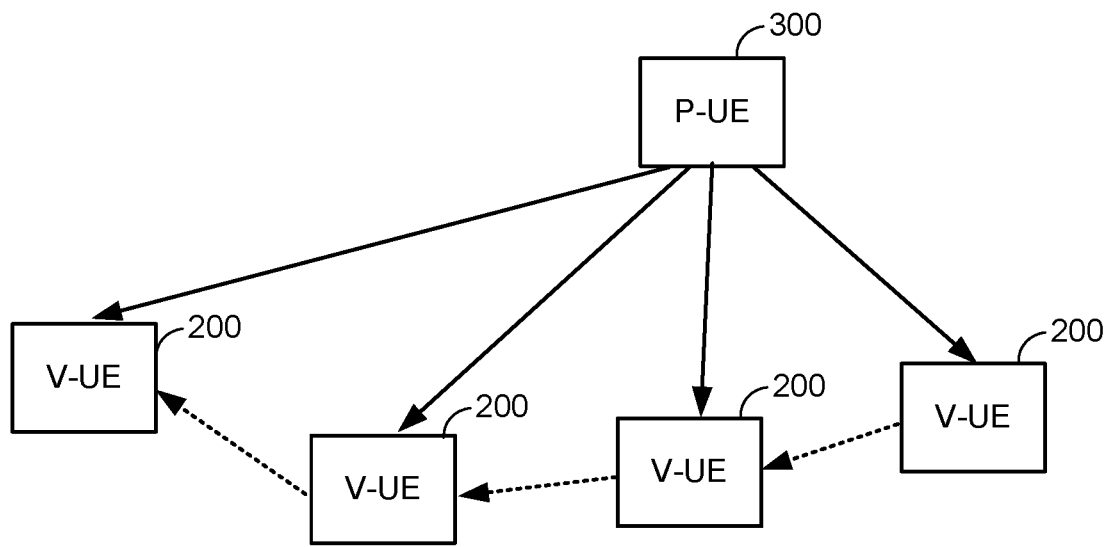
FIGS. 5A and 5B illustrate examples of ranging signal transmission according to aspects of the disclosure.

At 404, one or more V-UEs 200 within communication range of the P-UE 300 can measure various properties of each received ranging signal transmitted by the P-UE 300. These properties may include the time-of-arrival (ToA) of the ranging signal with respect to each V-UE's 200 local clock and/or the angle-of-arrival (AoA) of the ranging signal. Since the one or more V-UEs 200 are likely moving, the V-UEs 200 are able to make several measurements of the P-UE's 300 ranging signals at different positions. In contrast, since the P-UE 300 moves slowly, its position is assumed to be unchanged. This is illustrated in FIG. 5A.

In an aspect, the AoA can be measured using an array of antennas (e.g., antenna(s) 202) that are close together (e.g., at the rooftop of the V-UE 200). If, however, different antennas are at different parts of the V-UE 200 (e.g., at the rooftop, near the side-mirrors, etc.), it can be more challenging to estimate the AoA because the signal paths received by these antennas may be different. In fact, some of them may be Non-Line-of-Sight (NLOS). However, it is possible to identify which antennas receive the Line-of-Sight (LOS) path by examining the channel profile (including received power and channel impulse response) at each antenna. For example, an LOS path typically has the highest received power and has a dominant first peak in the channel impulse response. Thus, to better estimate the AoA, the channel profile at each antenna is examined and, for each antenna, the received ranging signal is used to calculate the AoA only if the channel profile of the ranging signal is determined to be LOS.

After measuring a series of ranging signals from the P-UE 300 at 404, at 406, the one or more V-UEs 200 calculate an estimate of the position of the P-UE 300 and a confidence in that estimate based on the measurements of the P-UE's 300 ranging signals and the V-UE(s)' 200 SPS position(s) at the times of the measurements. More specifically, a V-UE 200 will know its own SPS position at the time it receives each ranging signal from the P-UE 300. Based on those known positions and the transmission times and the AoAs of the received ranging signals, the V-UE 200 can estimate the position of the P-UE 300. For example, the V-UE 200 assumes that the ranging signals travel at the speed of light, and therefore, can calculate the distance from the V-UE 200 to the P-UE 300 at each SPS position at which it receives a ranging signal by multiplying the known transmission time of the ranging signal (the difference between the times the ranging signal was transmitted by the P-UE 300 and the times the ranging signal was received at the V-UE 200) by the known speed of light. Combined with the AoA of the ranging signal and the known SPS position of the V-UE 200, the V-UE 200 can calculate an estimate of the position of the P-UE 300. The position may be represented as, for example, x-y coordinates that are the distance and direction from the x-y coordinates (SPS position) of the V-UE 200. The V-UE 200 can then combine (e.g., average) the position estimates calculated for each of the received ranging signals to generate a more accurate final position estimate.

Note that the transmission time would be known in this case (excluding for the clock errors at the transmitter and the receiver) as the transmitter (e.g., P-UE 300) first informs the receiver (e.g., V-UE 200) of which resource (time and frequency) it will use to transmit the ranging signal. Since a time-synchronous system can be assumed, the time of the start of the resource is known. There are clock errors at the transmitter and receiver, so the actual transmission time has some small error and so does the receiver's assumption of the subframe time. The clock errors are cancelled later using round-trip-time (RTT)-like calculations, as discussed below.

Further note that the SPS position of a V-UE 200 is generally more accurate than a P-UE's 300 SPS position since a V-UE 200 will generally have better GPS reception. Each of the one or more V-UEs 200 may also estimate the relative clock bias and clock drift between itself and the P-UE 300 by performing estimation over multiple measurements, under the assumption that the position of P-UE 300 remains largely unchanged during the period of those measurements. Generally, the V-UE 200 will be more confident about its estimation of the P-UE's 300 position if the angles of arrival of the series of ranging signals from the P-UE 300 are considerably different, as this allows for better triangulation.

More specifically, RTT procedures can be used to cancel the clock offset between a transmitter (e.g., P-UE 300) and a receiver (e.g., a V-UE 200). In an aspect, each node (e.g., V-UEs 200, P-UEs 300) broadcast ranging signals, and other nodes respond with the measured ToAs of those ranging signals within a small ranging time window (e.g., 4 ms). The purpose of the small ranging time window is to capture a snapshot of the local network and minimize clock drift. The distance between two nodes can be calculated as:

$$\frac{c}{2}(T_2 - T_1) + \frac{c}{2}(T_4 - T_3)$$

where $T_1$ is the transmission time of a ranging signal from the transmitter, $T_2$ is the ToA of the ranging signal at the receiver, $T_3$ is the transmission time of a response signal from the receiver, $T_4$ is the ToA of the response signal at the transmitter, and c is the speed of light. If the error in $T_1$ and $T_4$ are the same, then it cancels out. If the error in $T_2$ and $T_3$ are the same, then it cancels out for the other node as well.

The above RTT procedure can be performed periodically (e.g., every second) as a three-phase protocol. As a first phase, each node (e.g., V-UEs 200, P-UEs 300) broadcasts the relative location of its antennas relative to the center of the location of the node, identifiers of the sequences to be transmitted by those antennas, and the transmission resources to be used. As a second phase, each node transmits a wideband sequence with the determined sequence identifier and resource (i.e., a ranging signal). At a third phase, each node broadcasts the ToAs of the ranging signals it received during the second phase and its own GPS location at the time of the second phase.

At 408, each V-UE 200 sends a message back to the P-UE 300 that contains the V-UE's 200 estimated position of the P-UE 300 and the associated confidence in that position. To reduce the amount of time the P-UE 300 is awake for the reception of the messages from the one or more V-UEs 200, there may be a mapping between the resources on which the P-UE 300 transmits the ranging signals and the resources on which it expects to receive the response message(s) from the one or more V-UEs 200, as discussed above with respect to the three-phase protocol. Thus, the P-UE 300 can be awake only for those time instants when it expects to receive the response message(s). The P-UE 300 can also decide whether or not it wants to process all of the messages from different V-UEs 200. For example, to save power, the P-UE 300 can stop decoding further messages once it determines that it has a sufficient number of messages (position estimates) from different V-UEs 200. In addition, to reduce the number of message transmissions from different V-UEs 200 and to reduce collisions in the response resources, only those V-UEs 200 that calculated the position of the P-UE 300 above some confidence threshold may transmit a position message back to the P-UE 300 at 408. The threshold could be specified in the applicable standard, or may be encoded in the ranging signals from the P-UE 300 (e.g., the ranging signal may include the threshold, or may include a value to a lookup table of thresholds).

At 410, after receiving one or more such messages from the one or more V-UEs 200, the P-UE 300 calculates a combined estimate of its position. The combined position estimate may consider the confidence of the reported position estimations. For example, the confidence in the combined position estimate may be a combination of the confidence levels in each of the constituent position estimates. In an aspect, the P-UE 300 may combine the received estimates with its own position estimate (e.g., with its own SPS position), or adopt a position estimate calculated by combining the position estimates received from the one or more V-UEs 200 as its position. At 412, the P-UE 300 can then use the combined estimation of its position and the associated confidence in subsequent BSMs that are optionally broadcast to neighboring UEs (e.g., other P-UEs and/or V-UEs).

Figure 6:
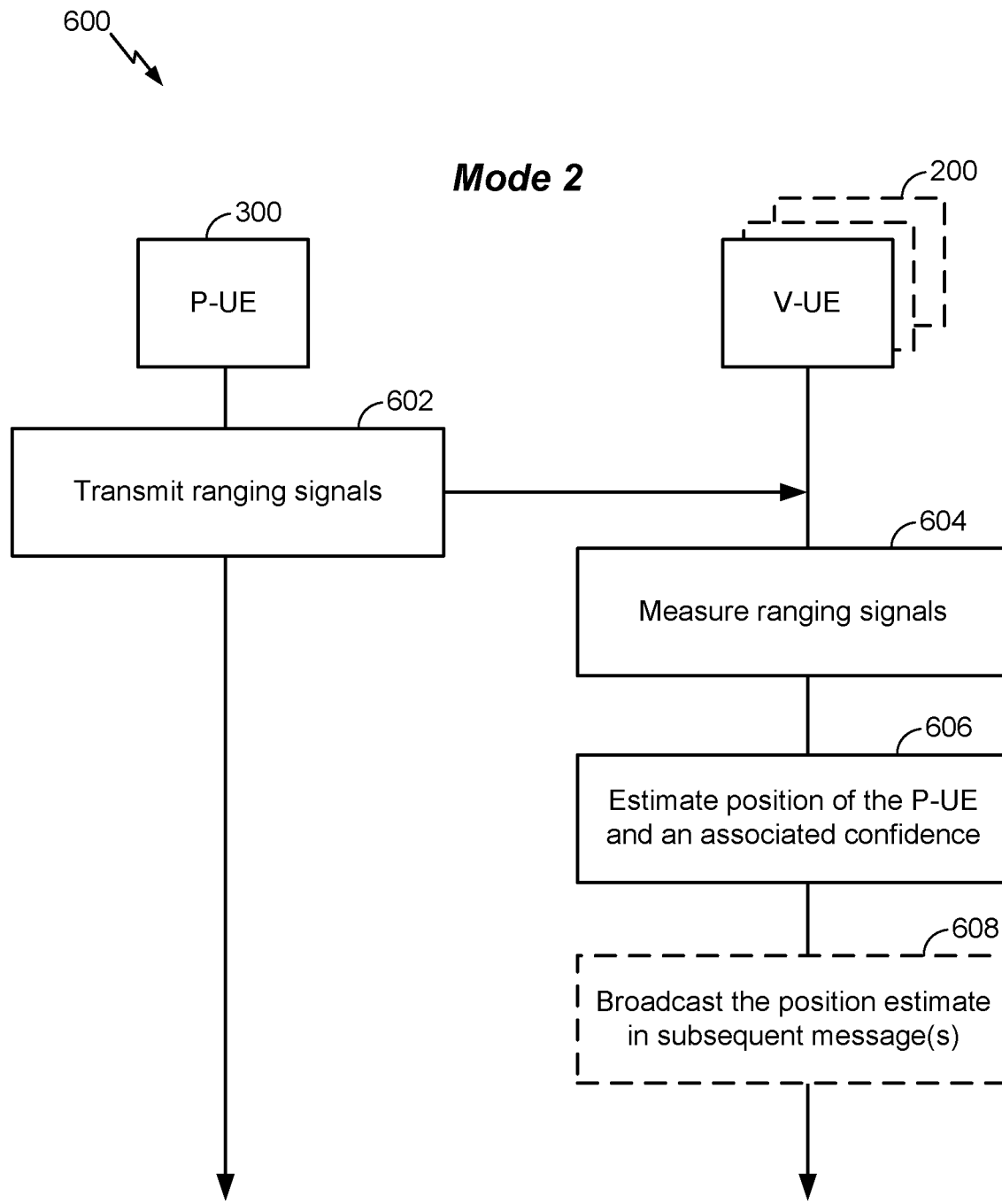
FIG. 6 illustrates a method of the second mode for using ranging signals to determine an accurate position of a pedestrian.

FIG. 6 illustrates an exemplary method 600 of the second mode for using ranging signals to determine an accurate position of a pedestrian (i.e., a P-UE). In the first mode, the P-UE 300 estimates its position in order to broadcast it in subsequent BSMs. In some cases, a P-UE 300 may be not capable of BSM transmission or not interested in BSM transmission. Also, the P-UE 300 may intend to save power. In these situations, the P-UE 300 can operate in the second mode, which is a simplified version of the first mode.

At 602, as at 402, the P-UE 300 transmits ranging signals in multiple ranging resource pools. As discussed above, the P-UE 300 may transmit its ID along with the ranging signals. The P-UE 300 may also indicate that it is in the second mode. In an aspect, the ID and the mode indication may be encoded in the ranging signal. For example, the ranging signal may be a Zadoff-Chu sequence, and the sequence ID may indicate the ID of the P-UE 300 and the use of the second mode.

At 604, one or more V-UEs 200 in communication range of the P-UE 300 receive the ranging signals from the P-UE 300 and measure various properties of each ranging signal. As discussed above, these properties may include the ToA of the ranging signal with respect to the V-UE's 200 clock and/or the AoA of the ranging signal.

At 606, after measuring a series of ranging signals from the P-UE 300, each V-UE 200 can calculate an estimate of the position of the P-UE 300 and a confidence in the estimate based on the measurements of the received ranging signals and the V-UE's 200 SPS positions at the times of the measurements. Once a V-UE 200 has estimated the position of the P-UE 300, the V-UE 200 can avoid going near the P-UE 300 by, as necessary, changing its path, reducing its speed, etc. At 608, the V-UE 200 can optionally transmit a message (e.g., a BSM) containing this information to other V-UEs 200 (e.g., a pedestrian has been detected at this position and, optionally, with this confidence).

In contrast with the first mode, the one or more V-UEs 200 that received the ranging signals from the P-UE 300 at 604 do not send a message back to the P-UE 300, based on the indication that the P-UE 300 is in the second mode. In this way, the second mode is quite power efficient for P-UEs 300, as the P-UEs 300 merely transmit ranging signals and then sleep; they do not receive anything in response as in the first mode.

Figure 7:
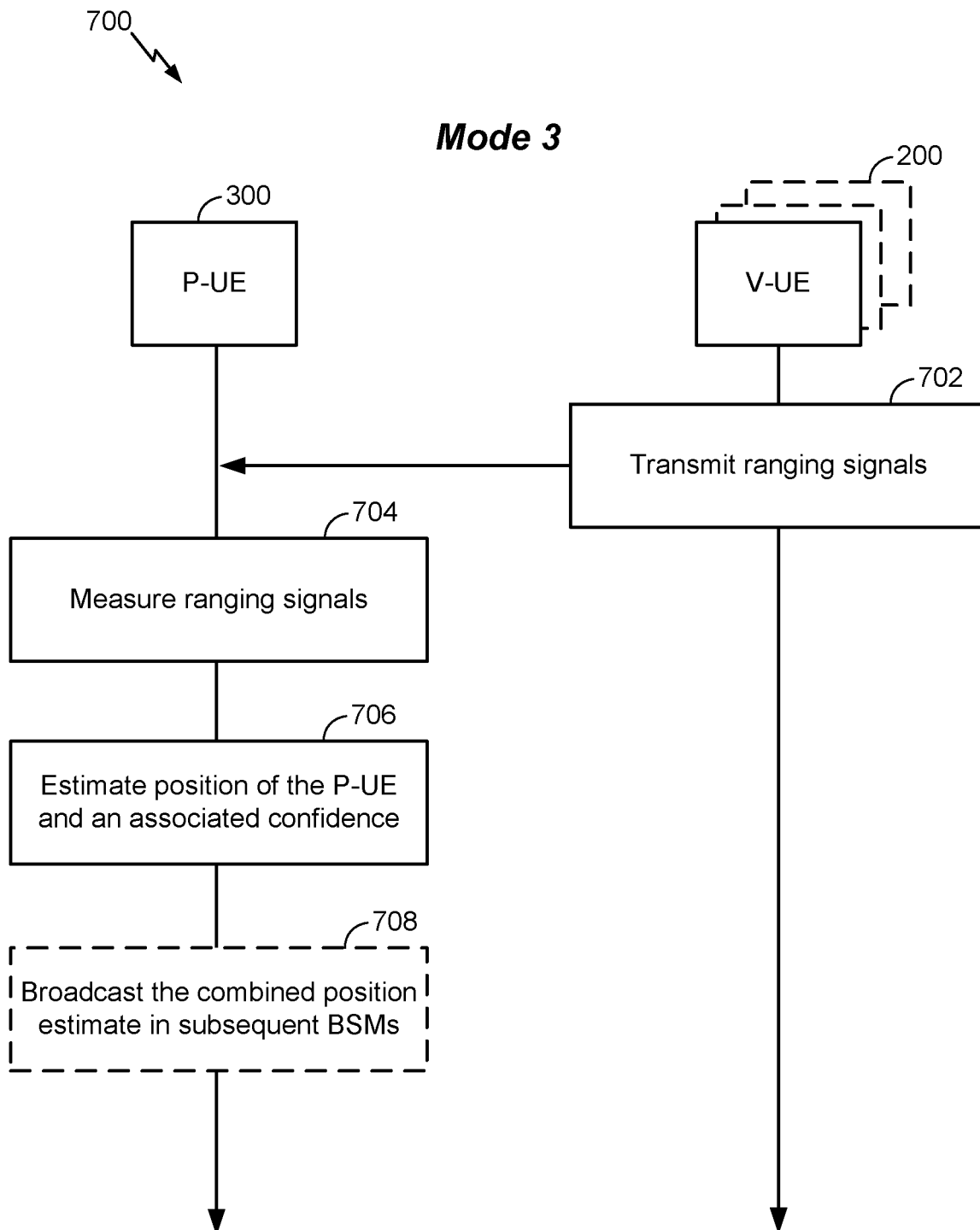
FIG. 7 illustrates a method of the third mode for using ranging signals to determine an accurate position of a pedestrian.

FIG. 7 illustrates an exemplary method 700 of the third mode for using ranging signals to determine an accurate position of a pedestrian (i.e., a P-UE). In the third mode, V-UEs 200 transmit ranging signals and P-UEs 300 passively listen. Specifically, at 702, one or more V-UEs 200 transmit ranging signals in one or more ranging resource pools. As described above, the ranging resource pool may consist of a set of time and/or frequency resources (e.g., 10 subframes in LTE/5G terminology) and may occur periodically (e.g., once every second). The one or more V-UEs 200 may transmit a ranging signal in each of several consecutive ranging resource pools.

In an aspect, each V-UE 200 may transmit its ID along with the ranging signals. The ID may be encoded in, for example, the ranging signals. For example, the ranging signals may be Zadoff-Chu sequences, and the sequence ID may correspond to the ID of the V-UE 200. By assigning orthogonal Zadoff-Chu sequences to each V-UE 200, the cross-correlation of simultaneous transmissions from V-UEs 200 is reduced, thereby reducing interference and uniquely identifying V-UE 200 transmissions.

Figure 5B:
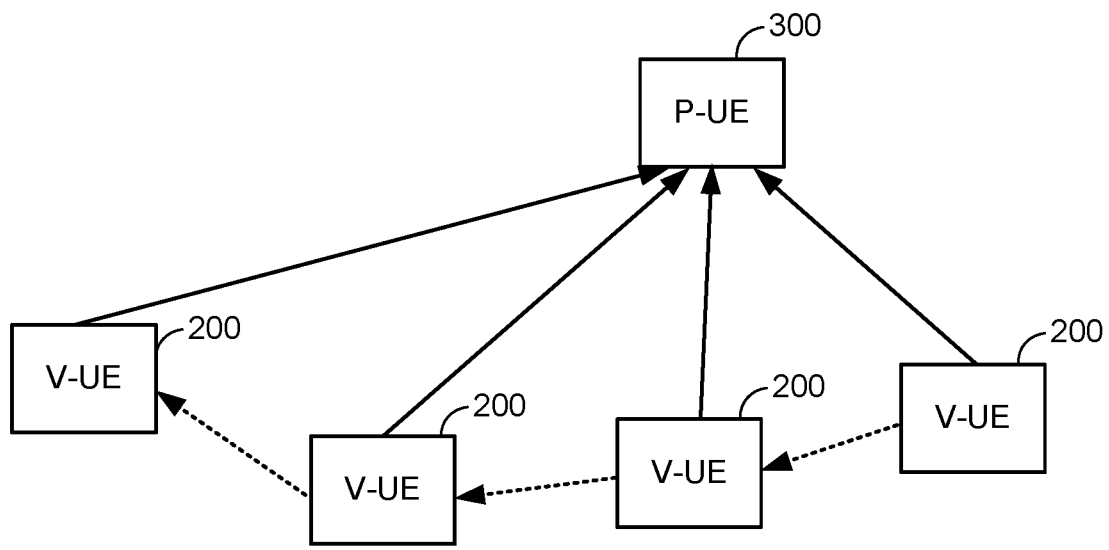

At 704, a P-UE 300 that intends to refine its position and is in communication range of the one or more V-UEs 200 can measure one or more properties of each received ranging signal. These properties may include the ToA of the ranging signal with respect to the P-UE's 300 local clock and/or the AoA of the ranging signal at the P-UE 300. Since the one or more V-UEs 200 are moving, the P-UE 300 can make several measurements of the ranging signals from each of the one or more of the V-UEs 200 at different positions of the one or more V-UEs 200. Since the P-UE 300 moves slowly, its position can be assumed to be unchanged during these measurements. This is illustrated in FIG. 5B.

After measuring a series of ranging signals from one or more V-UEs 200, at 706, the P-UE 300 can calculate an estimate of its own position and an associated confidence level based on the measurements of the ranging signals and the SPS positions of the V-UEs 200 at the times of the measurements. For example, the P-UE 300 can estimate its position based on the SPS positions of a V-UE 200 when it transmits ranging signals and the transmission times and the AoAs of the received ranging signals, as discussed above with reference to FIG. 4, but with the roles of the V-UE 200 and the P-UE 300 reversed. The SPS positions of the one or more V-UEs 200 may be derived from the BSMs broadcast by the V-UEs 200. In an aspect, the P-UE 300 may estimate its own position and the clock biases and clock drifts between the P-UE 300 and the one or more V-UEs 200.

In an aspect, the P-UE 300 may measure one or more ranging signals from different V-UEs 200, but not enough ranging signals from any one V-UE 200 to estimate the position of the P-UE 300 based on the ranging signals from that V-UE 200 alone, or at least not enough to estimate the position of the P-UE 300 within a threshold degree of accuracy. In that case, the P-UE 300 can calculate a single position estimate based on the combined ranging signals from multiple V-UEs 200.

Alternatively, the P-UE 300 may be able to measure a sufficient number of ranging signals from each of one or more V-UEs 200 to calculate a position estimate based on the ranging signals from each V-UE 200. The P-UE 300 may calculate a confidence level in each position estimate calculated based on the measurements of each set of ranging signals from a V-UE 200. Generally, the confidence level associated with a position estimate calculated based on a series of ranging signals from a given V-UE 200 will be higher if the angles of arrival of the series of ranging signals are considerably different. The P-UE 300 can then calculate a position estimate from the multiple position estimates by considering the associated confidence levels. For example, the P-UE 300 may only use position estimates with an associated confidence level that is above some threshold. The P-UE 300 can then combine the position estimates that have a confidence level above that threshold.

In an aspect, to reduce the power consumption of the P-UE 300, the P-UE 300 can determine a threshold accuracy level. Once the P-UE 300 has measured a sufficient number of ranging signals to calculate a position estimate having at least that threshold accuracy, it can stop measuring ranging signals.

At 708, the P-UE 300 can then use the calculated estimate of its position in subsequent BSMs that are optionally broadcasted to neighboring UEs (e.g., other P-UEs and/or V-UEs), or for other location-based services (e.g., navigation).

The different modes of operation described above with reference to FIGS. 4, 6, and 7 may coexist within the same system, provided both P-UEs and V-UEs can transmit ranging signals. The different modes may be differentiated by the ranging signals. For example, there may be at least three sets of sequence IDs associated with ranging signals, one for each mode. Within each set of ranging signals, a sequence ID can be mapped to a UE ID. Based on the sequence ID of a received ranging signal, the receiving UE (whether a P-UE 300 or a V-UE 200) can operate according to the identified mode. As will be appreciated, however, the differentiation of different modes may be achieved in other ways. For example, modes can be differentiated by using a combination of sequence ID and an explicit indication of the mode.

In some cases, one mode may provide better performance than another. For example, since a V-UE 200 may be able to determine better AoA measurements (e.g., due to a larger antenna array and the spatial separation of the antenna elements) than a P-UE 300, the first two modes may provide better estimation of the P-UE's 300 position. Therefore, a P-UE 300 may switch between different modes based on its assessment of the current accuracy of its position and/or other factors.

For example, if a P-UE 300 assesses that its current position accuracy is poor (based on, for example, poor SPS reception in a recent time window), it may initiate operation of the first mode by starting to transmit ranging signals. Alternatively, if a P-UE 300 has assessed that its current position accuracy is sufficiently good, it can use the third mode by passively listening to the ranging signals from V-UEs 200. In yet another alternative, if a P-UE 300 is not capable of or interested in BSM transmission, or intends to conserve power, it may choose the second mode.

Figure 8:
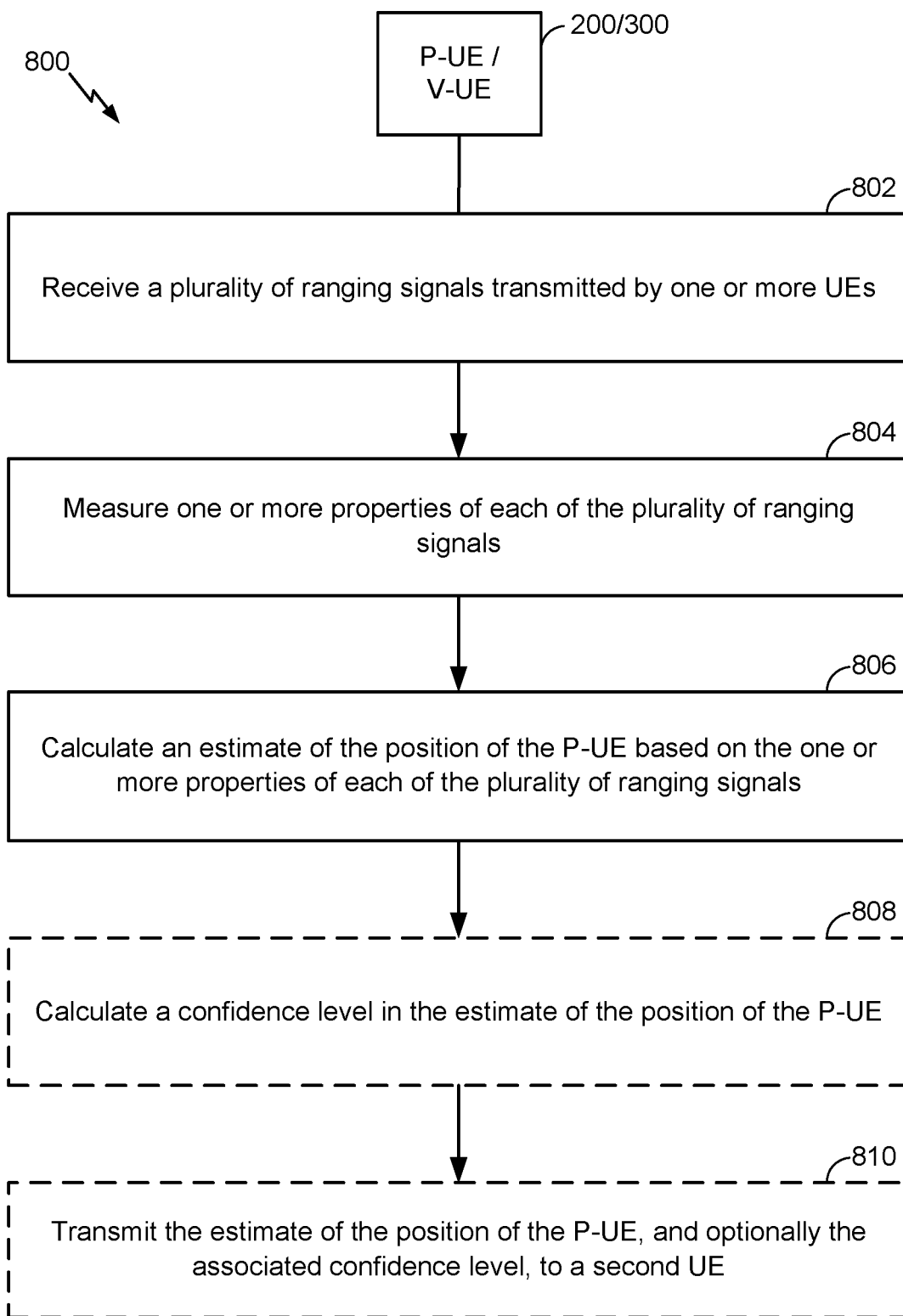
FIG. 8 illustrates an exemplary method for using ranging signals to determine a position of a pedestrian-UE according to at least one aspect of the disclosure.

FIG. 8 illustrates an exemplary method 800 for using ranging signals to determine a position of a pedestrian (e.g., P-UE 300) according to at least one aspect of the disclosure. The method 800 may be performed by a first UE operating in any of the three modes described above with reference to FIGS. 4, 6, and 7. As shown below, the method 800 may be performed by a V-UE 200 or a P-UE 300. At 802, the first UE (e.g., transceiver 204, WAN transceiver 304, or WLAN transceiver 306) receives a plurality of ranging signals transmitted by one or more other UEs (e.g., one or more V-UEs 200 or a P-UE 300), as described above with reference to 404 of FIG. 4, 604 of FIG. 6, and 704 of FIG. 7. At 804, the first UE (e.g., transceiver 204 and/or processor 210, or WAN transceiver 304 or WLAN transceiver 306 and/or processor 310) measures one or more properties (e.g., ToA, AoA) of each of the plurality of ranging signals, as described above with reference to 404 of FIG. 4, 604 of FIG. 6, 704 of FIG. 7. At 806, the first UE (e.g., processor 210 or processor 310) calculates an estimate of the position of the P-UE based on the one or more properties of each of the plurality of ranging signals, as described above with reference to 406 of FIG. 4, 606 of FIG. 6, 706 of FIG. 7. By performing operations 802 to 806, the first UE is able to determine an accurate position of the P-UE, which is beneficial where an accurate position of the P-UE is not otherwise available (e.g., where the P-UE does not have an accurate SPS position yet, or is not broadcasting its position to other UEs).

At 808, the first UE (e.g., processor 210 or processor 310) optionally calculates a confidence level in the estimate of the position of the P-UE, as described above with reference to 406 of FIG. 4, 606 of FIG. 6, 706 of FIG. 7. Operation 808 is optional because a confidence level does not need to be calculated. However, a benefit of calculating the confidence is that the first UE, or a different UE receiving the position estimate, will have an indication of how accurate the position estimate is, and therefore, to what extent it can rely on the position estimate.

At 810, the first UE (e.g., transceiver 204, WAN transceiver 304, or WLAN transceiver 306) optionally transmits (e.g., in a BSM) the estimate of the position of the P-UE to a second UE (e.g., one or more V-UEs 200 or the P-UE 300), and optionally the associated confidence level, as described above with reference to 408 of FIG. 4, 608 of FIG. 6, 708 of FIG. 7. Operation 810 is optional because the first UE need not transmit the position estimate, it can simply use it for its own purposes. However, a benefit of transmitting the position estimate, and optionally the confidence level, is that other nearby UEs will be able to use the position estimate of the P-UE in their own decision making (e.g., course changes, speed changes, etc.) or in combination with their own estimates of the position of the P-UE.

In an aspect, as described above, the confidence level may be based on AoAs of the plurality of ranging signals. As described above, the larger the differences between the AoAs of the plurality of ranging signals, the higher the confidence level, as larger differences between the AoAs allows for better triangulation.

In an aspect, the calculation of the position of the P-UE assumes that the P-UE is stationary. Although the P-UE may not be stationary, this is a reasonable assumption, as the P-UE is likely moving very slowly (e.g., at the pace of a walking pedestrian) compared to the speed of a V-UE, and simplifies the calculation of the position estimate.

In an aspect, the plurality of ranging signals may comprise a plurality of Zadoff-Chu sequences, and the sequence IDs of the plurality of ranging signals may correspond to the ID of the first UE. By assigning orthogonal Zadoff-Chu sequences to each P-UE and/or V-UE, the cross-correlation of simultaneous transmissions from P-UEs and V-UEs is reduced, thereby reducing interference and uniquely identifying P-UE and V-UE transmissions.

In an aspect, the plurality of ranging signals may be transmitted periodically in consecutive resource pools. A benefit of using specified resource pools is that other UEs will know where and how to receive the plurality of ranging signals, and interference can be mitigated.

In an aspect, if the one or more UEs comprise a plurality of V-UEs, the first UE can calculate a plurality of estimates of the position of the P-UE based on properties (e.g., ToA, AoA) of each of the plurality of ranging signals. In this aspect, calculating the estimate of the position of the P-UE at 806 may include calculating the estimate of the position of the P-UE by combining the plurality of estimates of the position of the P-UE. A combined position estimate may have a higher confidence level than a single position estimate, as it is based on more measurements than a single position estimate.

Figure 9:
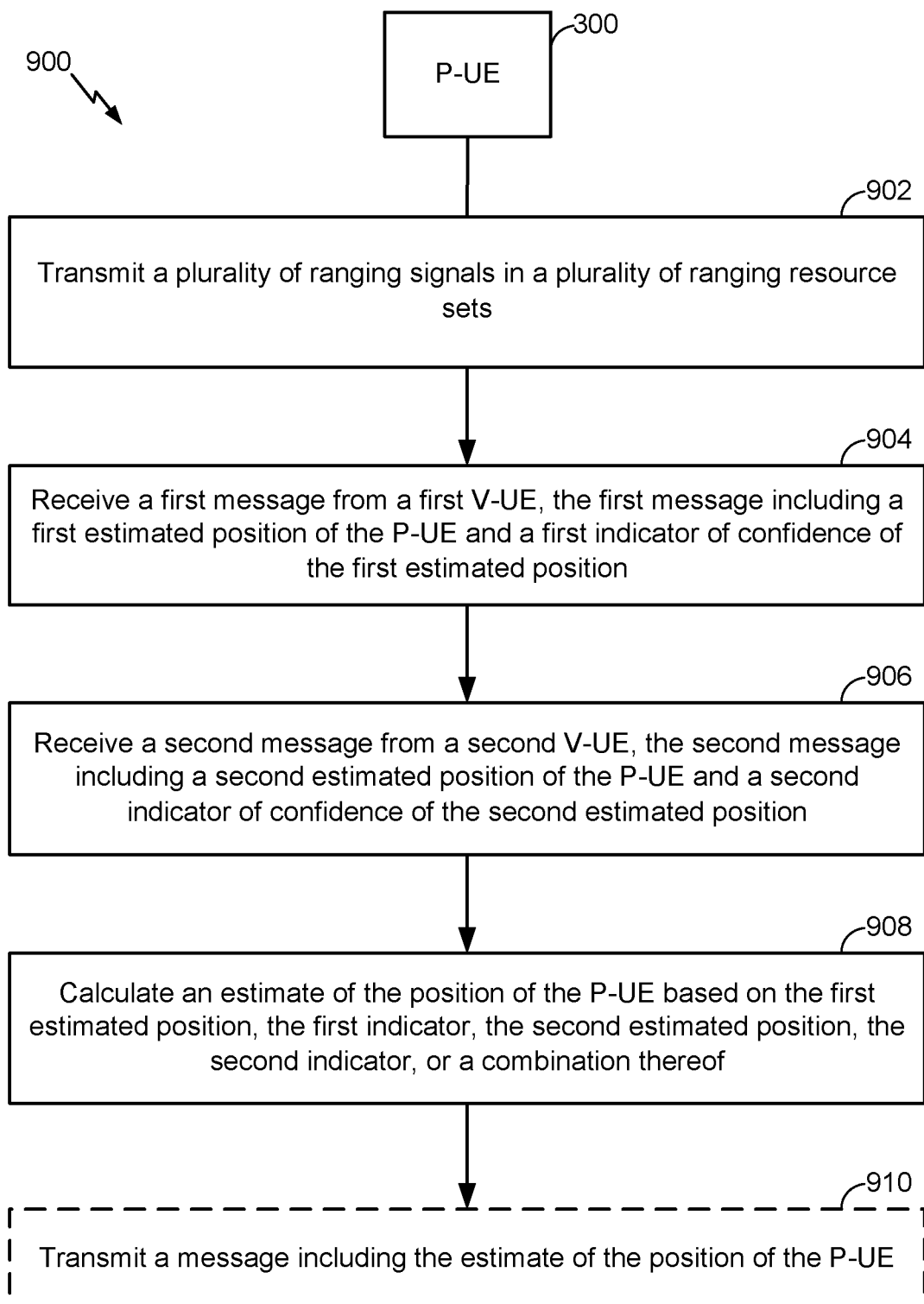
FIG. 9 illustrates an exemplary method for determining a position of a P-UE according to at least one aspect of the disclosure.

FIG. 9 illustrates an exemplary method 900 for determining a position of a P-UE (e.g., P-UE 300) according to at least one aspect of the disclosure. The method 900 may be performed by the P-UE (e.g., P-UE 300) operating in the first mode described above with reference to FIG. 4. At 902, the P-UE 300 (e.g., WAN transceiver 304 or WLAN transceiver 306) transmits a plurality of ranging signals in a plurality of ranging resource sets, as described above with reference to, for example, 402 of FIG. 4. At 904, the P-UE 300 (e.g., WAN transceiver 304 or WLAN transceiver 306) receives a first message (e.g., a BSM) from a first V-UE (e.g., a V-UE 200), the first message including a first estimated position of the P-UE and a first indicator of confidence of the first estimated position, as described above with reference to, for example, 408 of FIG. 4. At 906, the P-UE 300 (e.g., WAN transceiver 304 or WLAN transceiver 306) receives a second message (e.g., a BSM) from a second V-UE (e.g., a V-UE 200), the second message including a second estimated position of the P-UE and a second indicator of confidence of the second estimated position, as described above with reference to, for example, 408 of FIG. 4. At 908, the P-UE 300 (e.g., processor 310) calculates an estimate of the position of the P-UE 300 based on the first estimated position, the first indicator, the second estimated position, the second indicator, or a combination thereof, as described above with reference to, for example, 410 of FIG. 4.

At 910, the P-UE 300 (e.g., WAN transceiver 304 or WLAN transceiver 306) optionally transmits a message (e.g., a BSM) including the estimate of the position of the P-UE 300. Operation 910 is optional because the P-UE 300 need not transmit its position estimate, but rather, can use it only for its own purposes (e.g., refining its SPS position, providing it to an application providing position-based services (e.g., mapping), etc.).

In an aspect, the P-UE 300 may adopt the first estimated position or the second estimated position based on which of the first indicator or the second indicator indicates a higher confidence level. This is beneficial because it reduces the complexity of the calculations that the P-UE needs to perform. That is, the P-UE need not combine any position estimates, but rather, simply adopts one of them.

In an aspect, the calculating at 908 includes setting, by the P-UE, the estimate of the position of the P-UE as an average of the first estimated position and the second estimated position. A benefit of using the average of the position estimates is that if neither confidence indicator is significantly higher than the other, the average of the position estimates may provide a more accurate position of the P-UE 300.

In an aspect, as described above, the confidence level may be based on AoAs of the plurality of ranging signals. As described above, the larger the differences between the AoAs of the plurality of ranging signals, the higher the confidence level, as larger differences between the AoAs allows for better triangulation.

In an aspect, the calculation of the position of the P-UE assumes that the P-UE is stationary. Although the P-UE may not be stationary, this is a reasonable assumption, as the P-UE is likely moving very slowly (e.g., at the pace of a walking pedestrian) compared to the speed of a V-UE, and simplifies the calculation of the position estimate.

In an aspect, the plurality of ranging signals may comprise a plurality of Zadoff-Chu sequences, and the sequence IDs of the plurality of ranging signals may correspond to the ID of the first UE. By assigning orthogonal Zadoff-Chu sequences to each P-UE and/or V-UE, the cross-correlation of simultaneous transmissions from P-UEs and V-UEs is reduced, thereby reducing interference and uniquely identifying P-UE and V-UE transmissions.

In an aspect, the plurality of ranging signals may be transmitted periodically in consecutive resource pools. A benefit of using specified resource pools is that other UEs will know where and how to receive the plurality of ranging signals, and interference can be mitigated.

Figure 10:
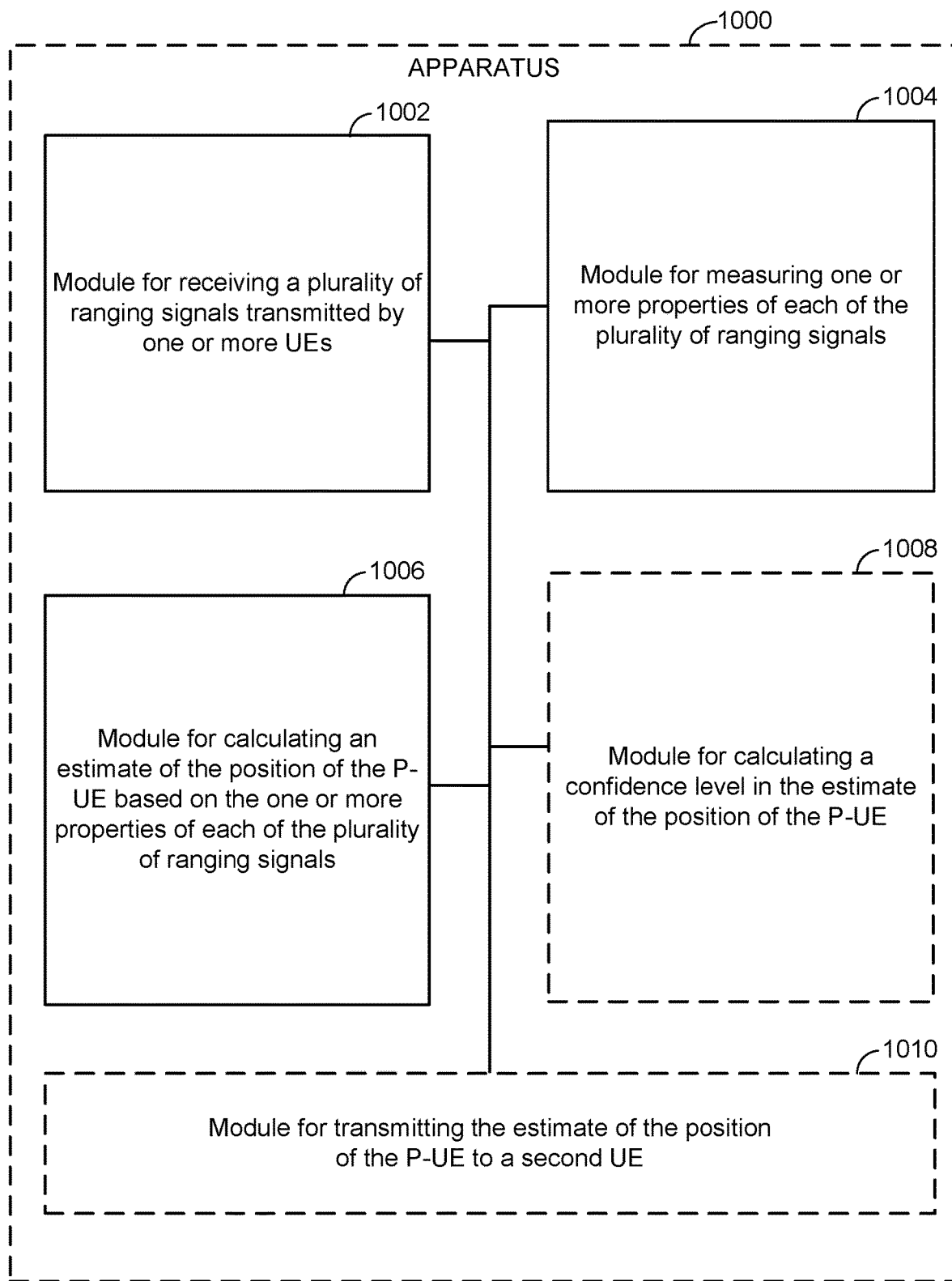
FIGS. 10-11 illustrate example apparatuses represented as a series of interrelated functional modules according to at least one aspect of the disclosure.

FIG. 10 illustrates an example apparatus 1000 represented as a series of interrelated functional modules. In an aspect, the apparatus 1000 may correspond to the V-UE 200 or the P-UE 300. A module for receiving 1002 may correspond at least in some aspects to, for example, a communication device, such as transceiver 204 in FIG. 2 or WAN transceiver 304 or WLAN transceiver 306 in FIG. 3, as discussed herein. A module for measuring 1004 may correspond at least in some aspects to, for example, a communication device in conjunction with a processing system, such as transceiver 204 in FIG. 2 or WAN transceiver 304 or WLAN transceiver 306 in FIG. 3 in conjunction with processor 210 in FIG. 2 or processor 310 in FIG. 3, respectively, as discussed herein. A module for calculating 1006 may correspond at least in some aspects to, for example, a processing system, such as processor 210 in FIG. 2 or processor 310 in FIG. 3, as discussed herein. An optional module for calculating 1008 may correspond at least in some aspects to, for example, a processing system, such as processor 210 in FIG. 2 or processor 310 in FIG. 3, as discussed herein. An optional module for transmitting 1010 may correspond at least in some aspects to, for example, a communication device, such as transceiver 204 in FIG. 2 or WAN transceiver 304 or WLAN transceiver 306 in FIG. 3, as discussed herein.

Figure 11:
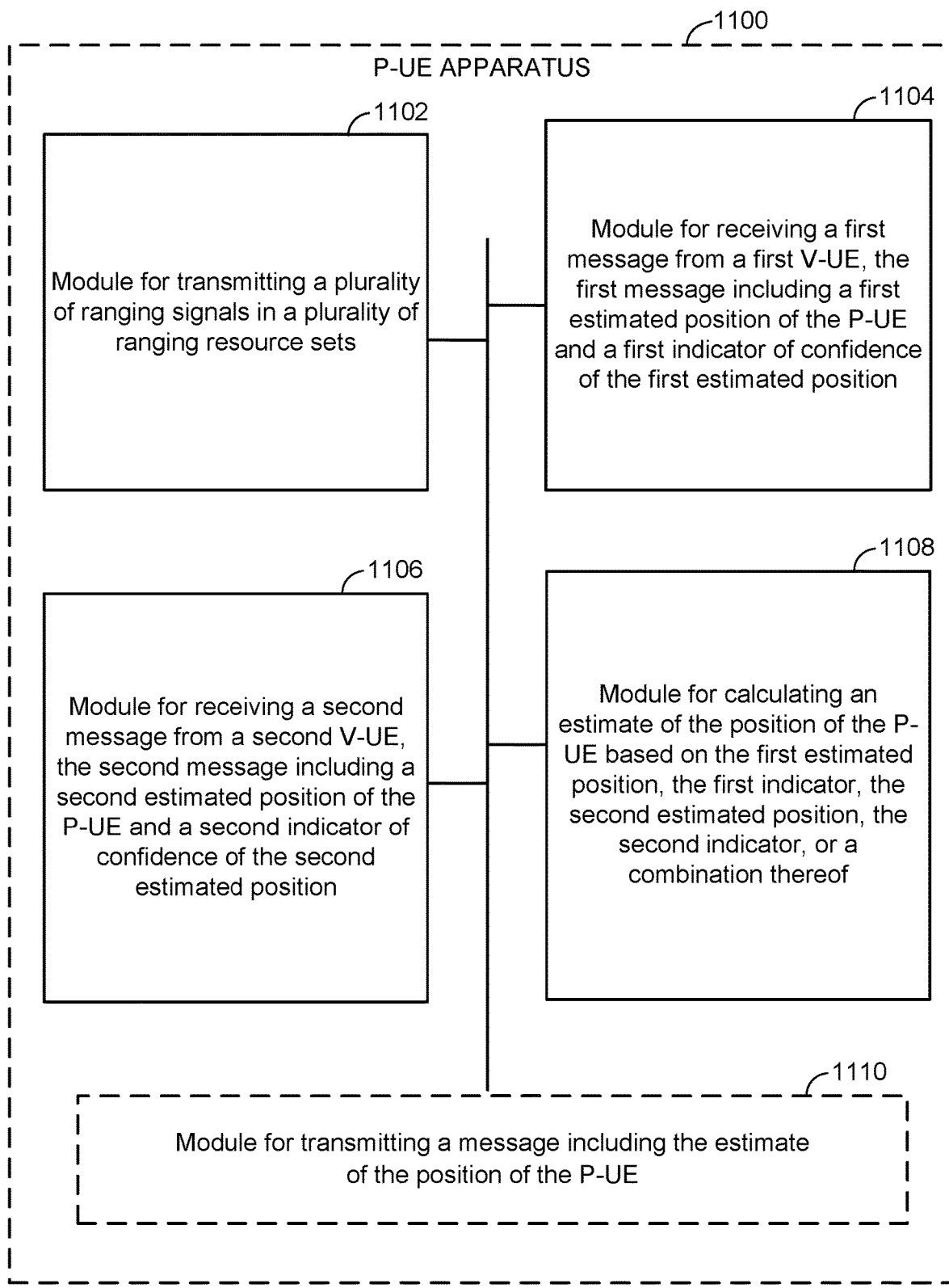

FIG. 11 illustrates an example P-UE apparatus 1100 represented as a series of interrelated functional modules. In an aspect, the apparatus 1100 may correspond to the P-UE 300. A module for transmitting 1102 may correspond at least in some aspects to, for example, a communication device, such as WAN transceiver 304 or WLAN transceiver 306 in FIG. 3, as discussed herein. A module for receiving 1104 may correspond at least in some aspects to, for example, a communication device, such as WAN transceiver 304 or WLAN transceiver 306 in FIG. 3, as discussed herein. A module for receiving 1106 may correspond at least in some aspects to, for example, a communication device, such as WAN transceiver 304 or WLAN transceiver 306 in FIG. 3, as discussed herein. A module for calculating 1108 may correspond at least in some aspects to, for example, a processing system, such as processor 310 in FIG. 3, as discussed herein. An optional module for transmitting 1110 may correspond at least in some aspects to, for example, a communication device, such as WAN transceiver 304 or WLAN transceiver 306 in FIG. 3, as discussed herein.

The functionality of the modules of FIGS. 10-11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 10-11, as well as other components and functions described herein, may be implemented using any suitable means. Such means also may be implemented, at least in part, using corresponding structure as taught herein. For example, the components described above in conjunction with the "module for" components of FIGS. 10-11 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for transmitting vehicle information messages among a plurality of vehicles.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A first user equipment (UE), comprising:
    a memory;
    at least one transceiver; and
    at least one processor communicatively coupled to the memory and the at least one transceiver, the at least one processor configured to:
        receive, via the at least one transceiver, one or more ranging signals transmitted by a second UE;
        perform one or more positioning measurements of each of the one or more ranging signals; and
        calculate an estimate of a position of the second UE based on the one or more positioning measurements of each of the one or more ranging signals and a known position of the first UE.

2. The first UE of claim 1, wherein the one or more positioning measurements of each of the one or more ranging signals comprise a time of arrival (ToA) of each of the one or more ranging signals, an angle-of-arrival (AoA) of each of the one or more ranging signals, or any combination thereof.

3. The first UE of claim 2, wherein the ToA of each of the one or more ranging signals is based on a local clock time of the first UE.

4. The first UE of claim 1, wherein the at least one processor is further configured to:
    cause the at least one transceiver to transmit the estimate of the position of the second UE to a third UE.

5. The first UE of claim 4, wherein the at least one processor is further configured to:
    calculate a confidence level in the estimate of the position of the second UE.

6. The first UE of claim 5, wherein:
    the one or more ranging signals comprise a plurality of ranging signals,
    the confidence level is based on AoAs of the plurality of ranging signals, and
    the confidence level is higher based on larger differences between AoAs of the plurality of ranging signals.

7. The first UE of claim 5, wherein the at least one processor being configured to cause the at least one transceiver to transmit the estimate of the position of the second UE to the third UE comprises the at least one processor being further configured to cause the at least one transceiver to transmit the confidence level in the estimate of the position of the second UE to the third UE.

8. The first UE of claim 4, wherein the third UE comprises the second UE.

9. The first UE of claim 4, wherein the third UE comprises at least one vehicle UE (V-UE).

10. The first UE of claim 9, wherein the at least one processor causes the at least one transceiver to transmit the estimate of the position of the second UE to the at least one V-UE in a Basic Safety Message (BSM).

11. The first UE of claim 1, wherein:
the first UE is a vehicle UE (V-UE), and
the second UE is a pedestrian UE (P-UE).

12. The first UE of claim 1, wherein each of the one or more ranging signals encodes an identifier of a UE by which the ranging signal was transmitted.

13. The first UE of claim 1, wherein the one or more ranging signals is transmitted periodically in consecutive resource pools.

14. The first UE of claim 1, wherein the position of the second UE is considered to be constant when calculating the estimate of the position of the second UE.

15. A method for using ranging signals to determine a position of a second user equipment (UE), comprising:
receiving, at a first UE, one or more ranging signals transmitted by the second UE;
performing, by the first UE, one or more positioning measurements of each of the one or more ranging signals; and
calculating, by the first UE, an estimate of the position of the second UE based on the one or more positioning measurements of each of the one or more ranging signals and a known position of the first UE.

16. The method of claim 15, wherein the one or more positioning measurements of each of the one or more ranging signals comprise a time of arrival (ToA) of each of the one or more ranging signals, an angle-of-arrival (AoA) of each of the one or more ranging signals, or any combination thereof.

17. The method of claim 15, further comprising:
transmitting, by the first UE, the estimate of the position of the second UE to a third UE.

18. The method of claim 17, further comprising:
calculating, by the first UE, a confidence level in the estimate of the position of the second UE.

19. The method of claim 18, wherein:
the one or more ranging signals comprise a plurality of ranging signals,
the confidence level is based on AoAs of the plurality of ranging signals, and
the confidence level is higher based on larger differences between AoAs of the plurality of ranging signals.

20. The method of claim 18, wherein transmitting the estimate of the position of the second UE to the third UE further comprises transmitting, by the first UE, the confidence level in the estimate of the position of the second UE to the third UE.

21. The method of claim 17, wherein the third UE comprises the second UE.

22. The method of claim 17, wherein the third UE comprises at least one vehicle UE (V-UE).

23. The method of claim 22, wherein the first UE transmits the estimate of the position of the second UE to the at least one V-UE in a Basic Safety Message (BSM).

24. The method of claim 15, wherein:
the first UE is a vehicle UE (V-UE), and
the second UE is a pedestrian UE (P-UE).

25. The method of claim 15, wherein the one or more ranging signals is transmitted periodically in consecutive resource pools.

26. The method of claim 15, wherein the position of the second UE is considered to be constant when calculating the estimate of the position of the second UE.

27. A first user equipment (UE), comprising:
means for receiving one or more ranging signals transmitted by a second UE;
means for performing one or more positioning measurements of each of the one or more ranging signals; and
means for calculating an estimate of a position of the second UE based on the one or more positioning measurements of each of the one or more ranging signals and a known position of the first UE.

28. A non-transitory computer-readable medium storing computer-executable instructions that, when executed by a first user equipment (UE), cause the first UE to:
receive one or more ranging signals transmitted by a second UE;
perform one or more positioning measurements of each of the one or more ranging signals; and
calculate an estimate of the position of the second UE based on the one or more positioning measurements of each of the one or more ranging signals and a known position of the first UE.

\* \* \* \* \*